United States Patent [19]

Kim et al.

[11] Patent Number: 5,043,118

[45] Date of Patent: Aug. 27, 1991

[54] WHISKER-REINFORCED CERAMIC MATRIX COMPOSITE BY INJECTION MOLDING

[75] Inventors: Hongkyu Kim, Somerset City; George L. Collins, Maplewood; O. Richard Hughes, Chatham, all of N.J.

[73] Assignee: Hoechst Celanese Corp., Somerville, N.J.

[21] Appl. No.: 452,166

[22] Filed: Dec. 18, 1989

[51] Int. Cl.$^5$ ............... C04B 35/64; C08K 3/00
[52] U.S. Cl. ........................ 264/63; 419/17; 428/367; 428/375; 524/413; 524/424; 524/427; 524/430; 524/431; 524/443; 524/512; 524/593
[58] Field of Search ............. 264/63; 524/413, 424, 524/427, 430, 431, 443, 512, 593; 428/367, 375; 419/17

[56] References Cited

U.S. PATENT DOCUMENTS

| | | | |
|---|---|---|---|
| 3,027,352 | 3/1962 | Wolling et al. | 524/593 |
| 4,543,345 | 9/1985 | Wei | 501/95 |
| 4,569,886 | 2/1986 | Divecha et al. | 420/379 |
| 4,624,812 | 11/1986 | Farrow et al. | 264/63 |
| 4,657,877 | 4/1987 | Becher et al. | 501/95 |

Primary Examiner—James Derrington
Attorney, Agent, or Firm—Depaoli & O'Brien

[57] ABSTRACT

An injection moldable ceramic composition is prepared by mixing a sinterable powder, a polyacetal binding agent and silicon carbide whiskers which have been coated with a polyacetal resin.

20 Claims, No Drawings

WHISKER-REINFORCED CERAMIC MATRIX COMPOSITE BY INJECTION MOLDING

BACKGROUND OF THE INVENTION

The present invention relates to a ceramic composition containing a polyacetal binder suitable for injection molding ceramic components. More particularly, the present invention relates to ceramic composites and the preparation thereof by injection molding a ceramic composition containing a polyacetal binder and silicon carbide whiskers which are uniformly dispersed within the composition and the final ceramic composite.

Ceramic materials are of critical importance for a number of high temperature, high performance applications. Recently, there has been substantial interest in the development of ceramic compositions for critical engine parts including reciprocating engines, gas turbine and rocket engines. These applications require a unique combination of properties such as high specific strength, high temperature mechanical property retention, low thermal and electrical conductivity, hardness and wear resistance, and chemical inertness. However, the inability to produce complex shapes of high dimensional accuracy and sufficient strength using an economical fabrication technique has prevented ceramic materials from fulfilling their potential in these critical high temperature, high performance applications.

Several processes have been used in an attempt to form ceramic bodies. Among such processes include pressing ceramic powder into a greenbody followed by sintering or by hot pressing and subsequently shaping or machining the sintered body to produce the finished product. Another technique is slip casting in which the ceramic particles are dispersed in water, the slurry placed in a mold and the water removed to form a greenbody. The pressing techniques have been found unsuitable to form ceramic articles of complex shapes and which must meet specific design specifications. The slip casting technique is time consuming and has not yielded greenbodies of sufficient strength.

In view of the problems associated with the prior techniques, injection molding has been increasingly used to form ceramic articles. Injection molding is a process wherein a moldable composition is forced into a mold or die. The injection molding process facilitates a rapid and repeated forming of a plurality of articles having a consistency with close dimensional tolerance. The injection molding process also minimizes the amount of shaping or machining that may be required to produce a finished article.

The injection molding process typically involves forming a ceramic greenbody by injection molding a composition comprising ceramic powder dispersed within a thermoplastic polymer, burning out the polymer from the green body, and sintering the resulting porous greenbody to a dense ceramic part with the same shape. The thermoplastic binder acts as a fluidizing agent to distribute the injection pressure throughout the mold and as the material which holds the ceramic particles in the shape of the mold after the part is ejected. A typical ceramic powder/thermoplastic polymer composite has a very high content of the ceramic particles, typically from about 50 to about 87 volume % and a minimum of the binder material to the hold the particles together in desired shape. A useful binder material for ceramic injection molding is a polyacetal resin as disclosed in U.S. Pat. No. 4,624,812, the entire contents of which are herein incorporated by reference.

A typical injection moldable ceramic composition will also contain a minor binder component which is often a thermoplastic, wax or oil, plasticizers which increase the fluidity of the ceramic-binder mixture, and processing aids such as surfactants which improve the wetting characteristics between the plastic binder and ceramic during mixing to form the composite.

A summary of injection molding applied to the fabrication of molded ceramic bodies is provided in an article entitled "Review: Fabrication of Engineering Ceramics by Injection Molding. I. Materials Selection", M. J. Edirisinghe et al, *International Journal of High Technology Ceramics, Vol. II,* 1986, pp. 1-31.

For use in high temperature, high performance applications, fracture toughness of the ceramic composite is a critical consideration. Conventional ceramic materials have relatively low fracture toughness with the exception of $Al_2O_3$—$ZrO_2$ and partially stabilized $ZrO_2$. Utilization of monolithic ceramic material such as SiC, $Si_3N_4$, $Al_2O_3$ and mullite ($3Al_2O_3.2SiO_2$) for the fabrication of structural components for use in heat engines and other high-temperature conversion systems has required the use of ceramic components with very small flaw size, e.g., less than about 50 m, in order to provide acceptable fracture toughness. However, in structural components especially of complex configuration, the determination of such small flaw sizes has been very difficult to achieve by using nondestructive inspection techniques.

Efforts to overcome the lack of sufficient fracture toughness in ceramic material have included the development of whisker-reinforced composites. The use of the single crystal silicon carbide whiskers in the ceramic composite has been found to improve the fracture toughness of the ceramic composite due to the ability of the whiskers to absorb cracking energy. The whiskers appear to toughen the composites by crack deflection, as when a crack encounters the whisker, crack bridging and by whisker "pull-out". Whisker "pull-out" occurs during cracking of the ceramic matrix at the SiC whisker-matrix interface where shear strength is relatively low as provided by radial tensile stresses across the whisker-matrix bond. As a crack-front propagates into the composite, many of the whiskers which span the crack line and extend into the ceramic matrix on opposite sides of the crack must be either fractured or pulled out of the matrix in order for the crack to grow or propagate through the ceramic. Since the single crystal SiC whiskers possess sufficient tensile strength to resist fracturing, they must be pulled out of the matrix for the crack to propagate. As these whiskers are pulled out of the matrix, they exhibit considerable bridging forces on the face of the crack and effectively reduce the stress intensity at the crack tip so as to absorb the cracking energy. Whisker pull-out, accordingly, effectively reduces the tendency of the composite to crack and also inhibits crack propagation. U.S. Pat. Nos. 4,543,345; 4,569,886 and 4,657,877 disclose silicon carbide whisker-reinforced ceramic composites.

Unfortunately, silicon carbide whisker-reinforced ceramic composites have only shown limited improvements in fracture toughness over the unreinforced ceramic. For example, alumina has a fracture toughness of about 4 $MPa.m^{\frac{1}{2}}$ while SiC whisker reinforced alumina has a fracture toughness of about 8-10 $mPa.m^{\frac{1}{2}}$. Continuous fiber alumina composites have a fracture toughness as high as 25 MPa.m$^{\frac{1}{2}}$. One possible reason for the unsatisfactory improvement is that the fracture strength of the composite is limited by the nonuniform distribution of the whiskers within the composite. Typical methods of mixing and dispersing the SiC whiskers within the ceramic powders involve mixing in a liquid medium such as alcohol or water with the use of a high shear ultrasonic homogenizer. More elaborate sedimentation techniques have also been used in an attempt to uniformly disperse the whiskers within the ceramic powder mix. Unfortunately, due to the size and shape of the whiskers, and particularly to the broad aspect ratio distribution and large aspect ratios (length/width) the whiskers as received and as produced are found as agglomerates and form clumps often called "nests". None of the mixing techniques has found much success in providing a homogeneous dispersion of the whiskers in the ceramic matrix. Agglomeration of the whiskers and the consequent local nonuniform densification of the composite are still observed, which result in large defects in the composite and/or regions of low fracture toughness. Additionally, in view of the severe whisker clumping which takes place and difficulty in forming a uniform mix of whiskers and ceramic powder, reduced levels of the whiskers must be used to form the ceramic composites. Obviously, substantial improvements in fracture toughness of the ceramic cannot be obtained if there is an insufficient amount of whisker loading.

Accordingly, improvements in whisker dispersion would be expected to provide for improvements in the strength and toughness of SiC whisker-reinforced ceramic composites. Such improvements form the basis and primary objective of the present invention.

SUMMARY OF THE INVENTION

In accordance with the present invention, silicon carbide whiskers are uniformly dispersed within an injection moldable ceramic composition comprising a ceramic or metal powder and a polyacetal binding agent. The improved dispersion of the silicon carbide whiskers is achieved by dispersing the whiskers in a dilute solution of a polyacetal resin so as to coat the whiskers, filtering the slurry, drying the coated whiskers to remove the solvent and adding the coated whiskers to the molding composition. The polyacetal resin has good dispersing and wetting characteristics to disperse the whiskers and is compatible with the polyacetal binder component of the ceramic molding composition. Subsequent to injection molding, the molded article is heated to remove the binding agent and can be subsequently sintered.

DETAILED DESCRIPTION OF THE INVENTION

The ceramic material found to be particularly useful for fabricating the ceramic composites of the present invention includes $Al_2O_3$, mullite ($3Al_2O_3.2SiO_2$), $B_4C$, $Si_3N_4$, cordierite ($2MgO.2Al_2O_3.5SiO_3$), $Al_2O_3.ZrO_2$, $ZrO_2$, $Si_3N_4$ (with $Al_2O_3$ and $Y_2O_3$ dopants), and SiC (doped with B and C). This list of ceramic materials is not an attempt to limit the invention and, thus, any and all ceramic materials which can be converted into powders may find use in the present invention. Further, any sinterable powders may be used. Thus, metal powders, including metal alloys, can be used in this invention.

The ceramic composition of the present invention also includes a binding agent in an amount ranging from about 10 to 50% preferably from about 10 to about 35% by weight of the total mixture which serves to maintain the integrity of the shaped article prior to sintering. The binding agent is a polyacetal having the recurring unit —$OCH_2$—, and is preferably comprised of at least about 50 mole % of the oxymethylene unit. The term "polyacetal" and the recurring unit should be understood to encompass both homopolymers and copolymers which will be discussed in detail below.

The polyacetals employed as the binding agent in the present invention are per se known in the art. For example, polyacetals commercially available under the registered trademark Celcon may be prepared by polymerizing trioxane in accordance with teachings of U.S. Pat. No. 3,027,352, the contents of which are hereby incorporated by reference.

The polyacetal binding agent of the present invention yield numerous advantages. In particular, since the polyacetals depolymerize through unzipping of the polymer chain, heating causes a uniform evolution of volatiles which removes the polyacetal binding agent without causing disruptions in the structure that might otherwise lead to defects or weak spots in the molded article. Additionally, the volatile material is a clean burning fuel that does not leave any undesirable or difficultly removable residue.

A yet further significant advantage of the use of polyacetals as the binding agent is that by selecting certain comonomers, copolymer binding agents may be tailored to the specific ceramic powder employed. More specifically, trioxane can be polymerized with ethylene oxide, dioxolane, substituted dioxolanes, trioxepane and 1,4-dioxane in amounts ranging from about 2 to about 80 mole % of the total comonomers present. Such copolymers can provide a lower melting point, lower crystallinity and increased softness and flexibility. For instance, by copolymerizing dioxolane with trioxane in substantially equimolar proportions, a copolymer binding agent which is particularly suitable for aluminum oxide ceramic powder may be obtained.

The SiC whiskers used in the present invention are single crystals containing alpha, beta and mixed alpha and beta phases of silicon carbide. The average diameter of the whiskers is about 0.4–2 microns and the length about 10–80 microns. It is preferred that the aspect ratio of the whiskers be less than about 30. Most preferred are SiC whiskers with aspect ratios between about 5 to 20.

The whisker content in an average lot of a typical commercial whisker product is 80–90% with the rest being formed of silicon carbide powders. Chemical analysis of the whiskers typically show major impurities of oxygen: 0.1 wt. %; Mn, Mg, Fe, Al: 0.1–0.8 wt. %; Cr, K, Cu, Ni, Na: 100–1,000 ppm. SiC whiskers are manufactured from rice hulls and are commercially available as grade F-9, formerly known as ARCO SC-9 whiskers from Advanced Composite Materials Co., Greer, S.C. or under the trademark "Tokamax" obtainable from Tokai Carbon Company, Tokyo, Japan, which has a sales office in New York, N.Y. American Matrix, Inc., Knoxville, Tenn. and Tateho Chemical Ind., Kariya, Japan also market SiC whiskers. Other commercial sources of SiC whiskers are available. Because of the high purity of the SiC whiskers they are stable at temperatures up to 1800° C. in inert gases. Also, the thermal stability of the SiC whiskers in ceramic matrices at processing temperatures up to about 1900° C. provides a distinct advantage over continuous polycrystalline SiC fibers that typically degrade due to grain growth above about 1200° C. The invention is not intended to be limited to treatment of silicon carbide whiskers formed in any particular manner. Thus, any silicon carbide whisker, regardless of how manufactured, is believed to be beset by the disadvantages expressed previously and would benefit from the process of this invention.

The silicon carbide whiskers will comprise from about 3 to 30 volume % based on the ceramic molding composition corresponding from about 3 to approximately 35 wt. %.

Prior to incorporating the whiskers into the molding composition, the whiskers are dispersed in a polyacetal resin solution to remove the whisker clumps or nests. The dispersing solution for the whiskers comprises a dilute solution of a polyacetal resin. The preferred polyacetal resins are those which contain alkylene oxide units having 1 to 4 carbon atoms, including homopolymers and copolymers containing at least two different alkylene oxide units. Preferred polyacetal resins are those containing oxymethylene units and ethylene oxide units. A particularly preferred polyacetal resin is a polyacetal copolymer elastomer containing at least about 90 mol % of the following repeating units: $+OCH_2 +_m$ and $+O(CH_2 +_x]_n$ where x is an integer from 2 to 4, and wherein n is greater than m. A minor amount of a branching agent may be used. A preferred polyacetal elastomer is a copolymer containing from about 50–75 mol % ethylene oxide units, 25–40 mol % oxymethylene units and 0 to 10 mol % butanediol diglycidylether (BDGE) units. The ethylene oxide and oxymethylene units can be formed by copolymerization of dioxolane and trioxane, respectively, as is well known in the art. An especially preferred polyacetal elastomer is a copolymer containing about 70 mol % ethylene oxide and about 30 mol % oxymethylene. The polyacetal resins can be formed by known polymerization techniques such as those used to form the polyacetal binder. The dispersant solution may contain 1 to 20 weight percent of the polyacetal resin, preferably 3 to 15% and, more preferably, from about 4 to 10 wt. % of the polyacetal resin.

The solvent which is used in the whisker dispersing solution is not critical and can be any non-alcoholic solvent. In alcohol, the polyacetal resin precipitates out of solution and, thus, such solvents should be avoided.

Upon the addition of the whiskers to the polyacetal resin solution, a slurry of whiskers is formed. The slurry of whiskers is then filtered and dried to produce a thin coating of the polyacetal resin on the whiskers. The coated whiskers can be compounded with the mixture of ceramic powder and polyacetal binder. The dispersed whiskers are uniformly distributed through the ceramic powder and binder mixture and as well is compatible with the polyacetal binder which is used.

The ceramic molding composition may also contain small amounts of from about 1.0 to about 10% of known materials which serve an additional binding function. Such materials include low density polyethylene, atactic polypropylene, ethylene vinyl acetate and waxes such as stearic acid and paraffin wax.

In addition to the ceramic powder and the binding agent, the ceramic composition of the present invention may further contain conventional amounts of wetting agents, plasticizers and other types of processing aids which are added to the composition to obtain a suitable rheological system for molding. Specifically, from about 0.5 to about 2.0% by weight of wetting agents or surfactants can promote adhesion between the ceramic powder and the binding agent thereby reducing the degree of agglomeration. Suitable wetting agents or surfactants include lignite, mineral oil and low molecular weight waxes. Plasticizers in an amount of from about 1.0 to about 10% by weight decrease the viscosity of the composite to promote mixing. Typical plasticizers include waxes, silicones, alkyl phthalates, polyalkylene (e.g., polyethylene) glycols and linear saturated polyesters. Mold release agents in an amount of from about 0.05 to about 1.0% by weight prevent adhesion to the mold wall thereby facilitating removal of the shaped article from the mold. Typical mold release agents include silicones and various phthalates and amides such as Acrawax C and Hoechst Microwax C (fatty acid amides).

To mold the ceramic composition into shaped articles, the selected ceramic powder is initially dispersed or mixed in the binding agent. Also present at this time are any additives which are to be included in the composition including the coated whiskers. Mixing of the ceramic powder, the binding agent, dispersed whiskers and any other additives is performed in the absence of oxygen to preclude oxidation of the ceramic powder. This may be achieved by conducting the mixing operation in a vacuum or under an inert atmosphere such as nitrogen or argon.

To obtain a homogenous mixture, the components of the composition are first mixed at low shear and at a temperature of from about room temperature to about 200° C. for from about 5 minutes to about 60 minutes. The composition is then sheared in this temperature range for from about 5 to about 60 minutes. If the mixture has been heated, it is thereafter cooled, while mixing under shear is continued. For example, the temperature is reduced from about 200° to about 170° C. The resulting mixture should have a viscosity of less than about 1,000 poise at a shear rate of 1,000 sec$^{-1}$ as measured by a capillary rheometer at a temperature in the range of from about 100° to about 300° C.

The mixture is next extruded at a die temperature in the range of from about 190° to about 220° C. and a pressure in the range of from about 500 to about 2000 psig. Extrusion can be achieved by various pieces of equipment known to those of ordinary skill in the art. For example, the equipment may be a twin-screw extruder operating at a die temperature of about 70° C. and a pressure of about 1200 psig.

Alternatively, a mixer-extruder may be employed which intimately mixes the components of the composition in a substantial absence of air and then extrudes the mixture.

Subsequent to the extrusion step, the extrudate is chipped or chopped to obtain pieces of the composition which are in the range of from about 1/16 to about ¼ inch in maximum dimension. While extrusion and chipping may be eliminated and the composition directly injection molded, it is preferably extruded and then chipped or chopped into pieces which may be readily fed into a hopper feeder of conventional injection molding machine. The chipped composition is then heated to a temperature from about 175° to about 200° C., and injected at a pressure in the range from about 500 to about 1000 psig. into a cold mold (i.e., from about room temperature to about 70° C.) where the composition hardens. Pressure is maintained on the composition until hardening is achieved. Typically, this requires from about 20 to about 60 seconds.

To remove the binding agent and any volatile additives, the molded composition is gradually heated. Although the rate and final temperature will depend on the amount and type of components in the composition and the characteristics of the article, a typical rate of temperature increase will range from about 5° to about 20° C. per hour until a temperature in the range of from about 100° to about 300° C. is reached. The selected temperature is then maintained for from about 0.5 to about 2.0 hours.

The temperature is then raised to that required for sintering the ceramic powder. While the rate of final temperature will naturally depend upon the characteristics of the ceramic powder and the shaped article, a rate of temperature increase will generally be in the range of from about 50 to about 1000 degrees per hour until a temperature at a range from about 1000° to about 1800° C. is obtained. To fully sinter the ceramic powder, the shaped article is held at final temperature for about 15 minutes to about 8 hours. Sintering is generally undertaken in an atmosphere composed of air or an inert gas.

EXAMPLE

The following example illustrates the preparation of a ceramic green body from a composition comprising alumina, polyacetal binder and silicon carbide whiskers uniformly dispersed in accordance with the teachings of the present invention.

3 g of a polyacetal elastomer containing 70 mol % dioxolane, 29.975 mol % trioxane and 0.025 mol % BDGE were added to 70 ml of methylene chloride. The solution was clear and had a low viscosity of less than 1 centipoise. 3.5 g silicon whiskers from Tateho Chemical Ind. were added to the polyacetal elastomer solution and the mixture was stirred by magnetic stirrer and by sonification for 3 minutes. The solvent was dried off at room temperature and the dispersion and adhesion of the silicon carbide whiskers was examined by SEM. The SEM microscopy of the treated silicon carbide whiskers showed a good adhesion of the elastomer on the whiskers and a good dispersion of whiskers. The silicon carbide whiskers could be safely handled during the following shape-forming process.

A moldable ceramic composition was formed from the following components.

|  | Vol. % | Wt. % |
| --- | --- | --- |
| Alumina (Al6SG) 45.51 g | 54.4 | 75.2 |
| Coated silicon carbide whiskers 4.65 g | 13.1 | 7.7 |
| Celcon M450[1] 8.19 g | 27.2 | 13.5 |
| PEG Carbowax 20M 1.19 g | 5.3 | 2.0 |
| Stearic Acid 0.968 g |  | 1.6 |

[1] A copolymer formed from about 98 mol % oxymethylene units and about 2 mol % ethylene oxide units and having a melt index of about 45 g/10 minutes, Hoechst Celanese Corporation The above composition was mixed in a Brabender prep mixer with 30 ml mixing head/roller blade at 170° C. and 40–50 rpm.

After mixing the above composition was compression molded to prepare test bars. Compression molding was used in view the small amount of sample composition. The composition was granulated prior to molding. Using a Wabash hot press, the granulated composition was first melted at 190° C. for 5 minutes followed by compression at 190° C. for 1 minute at 1 ton on a 5 inch ram, for an additional minute at 10 tons and cold compression under tap water for 2 minutes at 10 tons. The mold produced a $0.5'' \times \frac{1}{8}'' \times 2\frac{1}{2}''$ bar.

SEM microscopy of the molded part indicated a uniform dispersion of the silicon carbide whiskers in the ceramic/binder mixture with no apparent agglomeration or whisker clumping.

What is claimed is:

1. An essentially solvent-free ceramic composition suitable for injection molding comprising a sinterable powder, a polyacetal binding agent in an amount effective to permit injection molding of the composition and silicon carbide whiskers which have been coated with a polyacetal resin containing alkylene oxide units of 1 to 4 carbon atoms.

2. The ceramic composition of claim 1 wherein said polyacetal resin is a polyacetal elastomer which is a copolymer formed from at least about 90 mol % of repeating units $+OCH_2 +_m$ and $+O(CH_2 +_x]_n$ (C wherein x is an integer from 2 to 4, and wherein n is greater than m.

3. The ceramic composition of claim 1 wherein said polyacetal binding agent comprises from about 10 to about 50 wt. % of said composition.

4. The ceramic composition of claim 1 wherein said polyacetal binding agent comprises a copolymer formed from oxymethylene units and alkylene oxide units which contain at least 2 carbon atoms.

5. The ceramic composition of claim 1 wherein said polyacetal binding agent comprises a copolymer composed of at least about 98 mol % oxymethylene units and up to about 2 mol % alkylene oxide units wherein the alkylene group contains at least 2 carbon atoms.

6. The ceramic composition of claim 1 wherein said coated silicon carbide whiskers comprise from about 3 to about 30 vol % based on said composition.

7. The ceramic composition of claim 2 wherein said polyacetal elastomer comprises about 50 to 75 mol % ethylene oxide units and about 25–40 mol % oxymethylene units.

8. The ceramic composition of claim 1 wherein said sinterable powder is a ceramic powder selected from the group consisting of alumina oxide, zirconium oxide, silicon dioxide, silicon nitride, silicon carbide, silicon, ferrite and mixtures thereof.

9. Silicon carbide whiskers useful for incorporation into a ceramic molding composition comprising silicon carbide whiskers having thereon a substantially uniform coating of a polyacetal resin.

10. The silicon carbide whiskers of claim 9 wherein said polyacetal resin is a copolymer elastomer comprising at least 90 mol % of repeating units $+OCH_2 +_m$ and $+O(CH_2 +_x]_n$ wherein x is an integer from 2 to 4, and wherein n is greater than m.

11. The silicon carbide whiskers of claim 10 wherein said polyacetal elastomer contains from about 50–70 mol % ethylene oxide units and 25–40 mol % oxymethylene units.

12. The silicon carbide whiskers of claim 10 wherein said polyacetal elastomer is a copolymer containing about 70 mol % ethylene oxide units and about 30 mol % oxymethylene units.

13. The silicon carbide whiskers of claim 10 wherein said polyacetal elastomer includes units of butanediol diglycidyl ether.

14. A process for molding and sintering a ceramic composition comprising forming an essentially solvent-free ceramic composition suitable for injection molding comprising (a) a sinterable powder, (b) a binding agent in an amount sufficient to permit injection molding of the composition, said binding agent comprising a polyacetal resin containing oxymethylene units, and (c) silicon carbide whiskers which have been coated with a polyacetal resin, injecting said composition into a mold, treating the injection molded composition to remove the binding agent, and sintering the composition subsequent to binding agent removal.

15. The process of claim 14 wherein said sinterable powder is a ceramic powder selected from the group consisting of alumina oxide, zirconium oxide, silicon dioxide, silicon nitride, silicon carbide, silicon, ferrite and mixtures thereof.

16. The process of claim 14 wherein said polyacetal binding agent comprises from about 10 to about 50 wt. % of said composition.

17. The process of claim 14 wherein said polyacetal binding agent comprises a copolymer formed from oxymethylene units and alkylene oxide units wherein said alkylene group of said alkylene oxide units contains at least 2 carbon atoms.

18. The process of claim 14 wherein said coated silicon carbide whiskers comprise from about 3 to about 30 vol % based on said composition.

19. The process of claim 14 wherein said polyacetal resin contains at least about 90 mol % of repeating units of $+OCH_2+_m$ and $+O(CH_2+_x]_n$ wherein x is an integer from 2 to 4, and wherein n is greater than m.

20. The process of claim 18 wherein said polyacetal resin comprises about 50 to 75 mol % ethylene oxide units and 25-40 mol % oxymethylene units.

* * * * *